(12) United States Patent
Ito

(10) Patent No.: US 9,631,076 B1
(45) Date of Patent: Apr. 25, 2017

(54) VULCANIZED RUBBER COMPOSITION AND TIRE USING SAME

(71) Applicant: SUMITOMO RUBBER INDUSTRIES, LTD., Kobe-shi, Hyogo (JP)

(72) Inventor: Wakana Ito, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/299,039

(22) Filed: Oct. 20, 2016

(30) Foreign Application Priority Data

Nov. 4, 2015 (JP) .................................. 2015-216745
Oct. 18, 2016 (JP) .................................. 2016-204525

(51) Int. Cl.
*C08L 9/06* (2006.01)
*C08L 9/00* (2006.01)

(52) U.S. Cl.
CPC .................. *C08L 9/06* (2013.01); *C08L 9/00* (2013.01); *C08L 2205/02* (2013.01)

(58) Field of Classification Search
CPC ........................................................ C08L 9/06
USPC ......................................................... 523/156
See application file for complete search history.

(56) References Cited

U.S. PATENT DOCUMENTS

| 5,679,744 A * | 10/1997 | Kawauzra | .................. C08L 7/00 525/314 |
| 7,671,132 B1 * | 3/2010 | Thielen | .................. B60C 1/0016 524/451 |
| 2010/0163151 A1 * | 7/2010 | Ishida | ....................... B60C 1/00 152/537 |
| 2013/0306865 A1 | 11/2013 | Nakamura et al. | |

FOREIGN PATENT DOCUMENTS

| EP | 1 518 895 A1 | 3/2005 |
| JP | 2006-348222 A | 12/2006 |
| JP | 2012-163480 A | 8/2012 |
| JP | 2014-231575 A | 12/2014 |

OTHER PUBLICATIONS

European Search Report issued in Application No. 16195208.0 dated Jan. 13, 2017.

* cited by examiner

*Primary Examiner* — Doris Lee
(74) *Attorney, Agent, or Firm* — Birch, Stewart, Kolasch & Birch, LLP

(57) ABSTRACT

A vulcanized rubber composition assuring a well-balanced improvement of abrasion resistance, fuel efficiency and breaking resistance and a tire using a tread made of the vulcanized rubber composition are provided. The vulcanized rubber composition comprises a phase (SBR phase) comprising a styrene butadiene rubber being incompatible with a butadiene rubber and silica, and a phase (BR phase) comprising a butadiene rubber and silica, wherein the SBR phase and the BR phase are incompatible with each other, an abundance ratio α of silica in the SBR phase after vulcanization satisfies $0.3 \leq \alpha \leq 0.7$ (Relation 1), and a proportion β of the styrene butadiene rubber being incompatible with the butadiene rubber satisfies $0.4 \leq \beta \leq 0.8$ (Relation 2), and the tire has a tread composed of the vulcanized rubber composition.

7 Claims, 1 Drawing Sheet

VULCANIZED RUBBER COMPOSITION AND TIRE USING SAME

TECHNICAL FIELD

The present invention relates to a vulcanized rubber composition and a tire having a tread composed of the vulcanized rubber composition.

BACKGROUND OF THE INVENTION

A low fuel consumption of a car has been attempted by reducing a rolling resistance of a tire (i.e. by improving fuel efficiency). Since a rolling resistance of a tire largely depends on heat build-up property of a rubber to be used for a tire member, so far development of a rubber for realizing low heat build-up thereof has been made actively, and various compounds being suitable for lower fuel consumption have been studied. Particularly as for a filler, not only a carbon black but also silica being advantageous for fuel efficiency has come to be used in many cases.

Meanwhile, so far a method of compounding a plurality of polymer (rubber) components (polymer blend) has been employed as a method for well-balanced improvement of various tire performances such as fuel efficiency, low-temperature property, performance on ice and snow and abrasion resistance. Specifically blending of some polymer components represented by a styrene butadiene rubber (SBR), a butadiene rubber (BR) and a natural rubber (NR) as rubber components of a tire has been mainly employed. This is a means for deriving physical properties of a vulcanized rubber composition by making use of characteristics of the polymer components while such properties cannot be derived only by a single polymer component.

In the polymer blend, a phase structure (morphology) of each rubber component and a distribution ratio of a filler such as silica in each rubber phase (a degree of localization of silica) after vulcanization will be important factors for determining physical properties. Elements for determining morphology and regulation of localization of a filler are very complicated, and various studies for exhibiting well-balanced physical properties of a tire have been made to date, and there is a room for improvement in any of the studies.

JP 2006-348222 A discloses a rubber composition for a side wall which is a polymer blend having a sea-island structure comprising a natural rubber and a butadiene rubber, wherein silica is localized in its discontinuous phase, however there is no description as to a polymer blend of styrene butadiene rubber and a butadiene rubber.

SUMMARY OF THE INVENTION

Meanwhile, in the case of a polymer blend of a butadiene rubber (BR) and a styrene butadiene rubber (SBR), there is a problem such that silica is locally distributed toward SBR, BR is not reinforced fully, and a stress is not applied uniformly to an entire rubber, thereby making it impossible to enhance abrasion resistance and breaking resistance, and a problem such that dispersibility of an entire system is lowered and fuel efficiency cannot be enhanced.

It is an object of the present invention to provide a vulcanized rubber composition being capable of well-balanced improvement of abrasion resistance, fuel efficiency and breaking resistance, and a tire having a tire member made of the vulcanized rubber composition.

The present invention relates to:
[1] a vulcanized rubber composition having:
a phase (SBR phase) comprising a styrene butadiene rubber being incompatible with a butadiene rubber and silica, and
a phase (BR phase) comprising a butadiene rubber and silica,
wherein the SBR phase and the BR phase are incompatible with each other,
an abundance ratio $\alpha$ of silica in the SBR phase after vulcanization satisfies the following Relation 1, and
a proportion $\beta$ of the styrene butadiene rubber being incompatible with the butadiene rubber satisfies the following Relation 2:

$0.3 \leq \alpha \leq 0.7$ (preferably $0.5 \leq \alpha \leq 0.6$)    (Relation 1)

$0.4 \leq \beta \leq 0.8$ (preferably $0.5 \leq \beta \leq 0.7$)    (Relation 2)

wherein $\alpha$=Amount of silica in SBR phase/(Amount of silica in SBR phase+Amount of silica in BR phase) and $\beta$=(Mass of styrene butadiene rubber being incompatible with butadiene rubber in vulcanized rubber composition/Mass of total rubber components in vulcanized rubber composition),
[2] the vulcanized rubber composition of the above [1], wherein an abundance ratio $\gamma$ of silica to the proportion $\beta$ of the styrene butadiene rubber being incompatible with the butadiene rubber satisfies the following Relation 3 and a dispersion ratio $\delta$ of silica in the entire system satisfies the following Relation 4:

$0.6 \leq \gamma \leq 1.4$ (preferably $0.8 \leq \gamma \leq 1.2$)    (Relation 3)

$\delta \leq 0.8$ (preferably $\delta \leq 0.6$)    (Relation 4)

wherein $\gamma=\alpha/\beta$ and $\delta$=Standard deviation of distance between silica/Average distance between silica,
[3] the vulcanized rubber composition of the above [1] or [2], comprising 15 to 120 parts by mass, preferably 50 to 100 parts by mass of the silica based on 100 parts by mass of the rubber components comprising the styrene butadiene rubber being incompatible with the butadiene rubber and the butadiene rubber,
[4] the vulcanized rubber composition of the above [1] or [2], comprising 15 to 120 parts by mass, preferably 30 to 100 parts by mass of a filler based on 100 parts by mass of the rubber components comprising the styrene butadiene rubber being incompatible with the butadiene rubber and the butadiene rubber, wherein the filler comprises not less than 50% by mass, preferably not less than 70% by mass of the silica based on the total amount of the filler,
[5] the vulcanized rubber composition of any one of the above [1] to [4], wherein the butadiene rubber is one having a cis-1,4 bond content of not less than 90%, preferably not less than 95%,
[6] the vulcanized rubber composition of any one of the above [1] to [5], comprising 15 to 80 parts by mass, preferably 20 to 70 parts by mass of a softening agent based on 100 parts by mass of the rubber components comprising the styrene butadiene rubber being incompatible with the butadiene rubber and the butadiene rubber, and
[7] a tire comprising a tread composed of the rubber composition of any one of the above [1] to [6].

According to the present invention, since in an incompatible system comprising a phase (SBR phase) comprising a styrene butadiene rubber being incompatible with a butadiene rubber and silica, and a phase (BR phase) comprising a butadiene rubber and silica, an abundance ratio $\alpha$ of silica in the SBR phase and a proportion $\beta$ of the styrene butadiene rubber being incompatible with the butadiene rubber are within predetermined ranges, a tire having well-balanced abrasion resistance, fuel efficiency and breaking resistance can be provided.

DETAILED DESCRIPTION

The vulcanized rubber composition of the present invention comprises a phase (SBR phase) comprising a styrene butadiene rubber being incompatible with a butadiene rubber and silica and a phase (BR phase) comprising a butadiene rubber and silica, wherein the SBR phase and the BR phase are incompatible with each other, an abundance ratio α of silica in the SBR phase after vulcanization satisfies the following Relation 1, and a proportion β of the styrene butadiene rubber being incompatible with the butadiene rubber satisfies the following Relation 2:

$$0.3 \leq \alpha \leq 0.7 \quad \text{(Relation 1)}$$

$$0.4 \leq \beta \leq 0.8 \quad \text{(Relation 2)}$$

wherein α=Amount of silica in SBR phase/(Amount of silica in SBR phase+Amount of silica in BR phase) and β=(Mass of styrene butadiene rubber being incompatible with butadiene rubber in vulcanized rubber composition/Mass of total rubber components in vulcanized rubber composition). The mass of the styrene butadiene rubber being incompatible with the butadiene rubber in the vulcanized rubber composition corresponds to the mass of the styrene butadiene rubber which is incompatible with the butadiene rubber and is compounded when preparing the vulcanized rubber, and the mass of the total rubber components in the vulcanized rubber composition corresponds to the mass of the total rubber components compounded when preparing the vulcanized rubber.

Figure 1A:
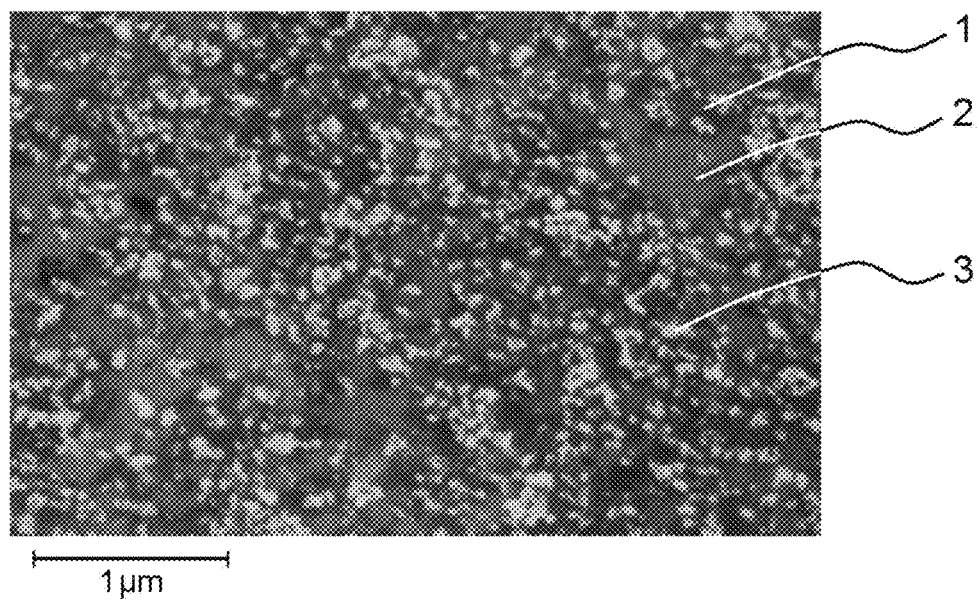
FIG. 1A is a FIGURE showing an SEM photograph of a vulcanized rubber composition wherein silica is well dispersed.
Figure 1B:
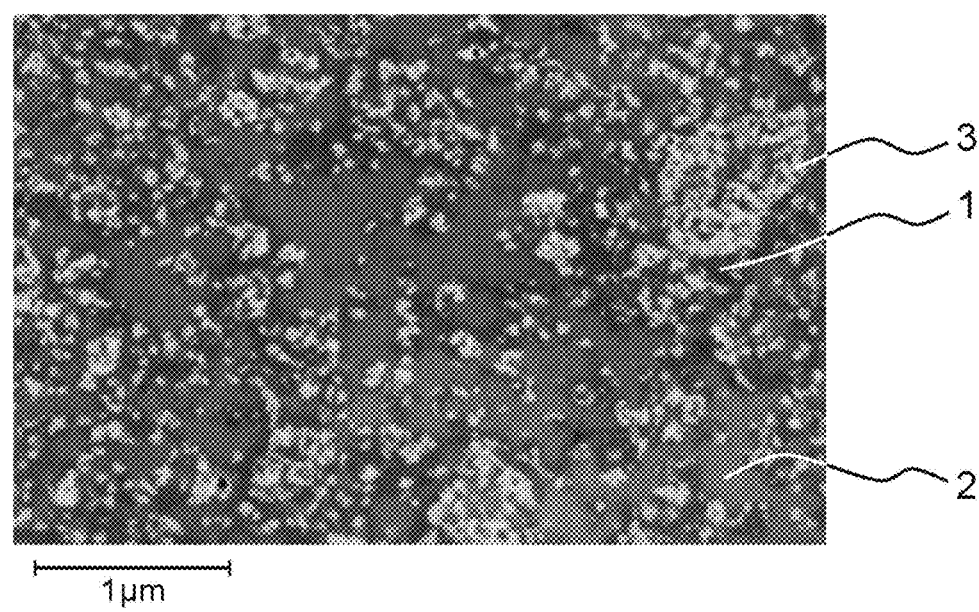
FIG. 1B is a FIGURE showing an SEM photograph of a vulcanized rubber composition wherein silica is localized.

A dispersion state of silica to the rubber components in the vulcanized rubber composition can be observed with a scanning electron microscope (SEM). For example, in an example of one embodiment of the present invention where dispersion of silica is satisfactory, as can be seen in FIG. 1A, a phase (SBR phase) 1 comprising a styrene butadiene rubber being incompatible with a butadiene rubber forms a sea phase, a phase (BR phase) 2 comprising a butadiene rubber forms an island phase, and silica 3 is dispersed to both of the SBR phase 1 and the BR phase 2. Meanwhile, in an example where silica is localized in one phase unlike the embodiment of the present invention, as can be seen in FIG. 1B, the silica 3 is localized in the SBR phase 1 and is not dispersed to both phases simultaneously, although the SBR phase 1 forms a sea phase and the BR phase 2 forms an island phase similar to FIG. 1A.

The vulcanized rubber composition of the present invention comprises the phase (SBR phase) comprising a styrene butadiene rubber being incompatible with a butadiene rubber and silica, and the phase (BR phase) comprising a butadiene rubber and silica, and the SBR phase and the BR phase are incompatible with each other. Herein, "incompatible", for example, when being used for a vulcanized rubber composition, means a case where a sea-island structure can be observed clearly in the section of the vulcanized rubber composition, and a case where in an identifiable phase structure, when a blending ratio is changed, contrast thereof varies in correlation with the change of the ratio even though the sea-island structure cannot be observed clearly. For example, being incompatible can be easily evaluated by an image taken with a scanning electron microscope (SEM). Otherwise, by measurement of a vulcanized rubber composition with DSC (differential scanning calorimeter) and the like, when two Tg peaks are obtained, it means that the components are incompatible with each other.

In addition, with respect to whether SBR is compatible or incompatible with BR, for example, as a styrene amount of SBR increases and as a vinyl amount is smaller, SBR tends to become incompatible with BR. Therefore, compatibility of SBR with BR can be predicted roughly from amounts thereof, but it is difficult to decide compatibility thereof unconditionally. Thus, it is preferable to determine whether SBR is compatible or incompatible with BR by kneading target SBR and BR with an additive such as a vulcanizing agent, for example, at 130° to 160° C. for 3 to 10 minutes, then vulcanizing the mixture, for example, at 140° to 170° C. for 10 to 60 minutes, and taking a photograph of the vulcanized rubber composition, for example, with a scanning electron microscope (SEM) and analyzing the photographed image in such a manner as mentioned above.

Further, in the vulcanized rubber composition of the present invention, since the abundance ratio α of silica in the SBR phase satisfies the following Relation 1, abrasion resistance, fuel efficiency and breaking resistance of the vulcanized rubber composition are enhanced. Herein "the abundance ratio α of silica in the SBR phase" is an index indicating how much amount of silica among the total amount of silica in the vulcanized rubber composition is present in the SBR phase.

$$0.3 \leq \alpha \leq 0.7 \quad \text{(Relation 1)}$$

wherein, α=Amount of silica in SBR phase/(Amount of silica in SBR phase+Amount of silica in BR phase).

Specifically, for example, the vulcanized rubber composition is subjected to surface shaping to obtain a sample. In a photograph of a scanning electron microscope (SEM) from one sample, ten regions of 2 μm×2 μm which do not overlap each other are selected. In each region, an area of silica per unit area and an area of silica in the SBR phase per unit area are measured to calculate the abundance ratio of silica in the SBR phase. When it can be confirmed that a difference between a maximum value and a minimum value of the abundance ratio of silica in the ten regions is within 10%, an average of the abundance ratios of silica in the ten regions is specified as a.

The abundance ratio α of silica in the SBR phase is not less than 0.3, preferably not less than 0.5. When the abundance ratio α of silica in the SBR phase is less than 0.3, there is a tendency that abrasion resistance, fuel efficiency and breaking resistance cannot be expected to be improved and are deteriorated. The abundance ratio α of silica in the SBR phase is not more than 0.7, preferably not more than 0.6. When the abundance ratio α of silica in the SBR phase is more than 0.7, there is a tendency that abrasion resistance, fuel efficiency and breaking resistance cannot be expected to be improved and are rather deteriorated.

The vulcanized rubber composition of the present invention is one in which the proportion β of the styrene butadiene rubber being incompatible with the butadiene rubber satisfies the following Relation 2:

$$0.4 \leq \beta \leq 0.8 \quad \text{(Relation 2)}$$

wherein β=(Mass of styrene butadiene rubber being incompatible with butadiene rubber in vulcanized rubber composition/Mass of total rubber components in vulcanized rubber composition). The mass of the styrene butadiene rubber being incompatible with the butadiene rubber in the vulcanized rubber composition corresponds to the mass of the styrene butadiene rubber which is incompatible with the butadiene rubber and compounded when preparing the vulcanized rubber, and the mass of the total rubber components in the vulcanized rubber composition corresponds to the mass of the total rubber components compounded when preparing the vulcanized rubber.

The proportion β of the styrene butadiene rubber being incompatible with the butadiene rubber is not less than 0.4, preferably not less than 0.5. When the proportion β of the styrene butadiene rubber being incompatible with the butadiene rubber is less than 0.4, there is a tendency that enhancement of fuel efficiency cannot be expected. Further the proportion β of the styrene butadiene rubber being incompatible with the butadiene rubber is not more than 0.8, preferably not more than 0.7. When the proportion β of the styrene butadiene rubber being incompatible with the butadiene rubber exceeds 0.8, the content of butadiene rubber becomes smaller and there is a tendency that enhancement of breaking resistance and abrasion resistance cannot be expected. In addition, the proportion β of the styrene butadiene rubber being incompatible with the butadiene rubber in the vulcanized rubber composition can also be obtained by measurement of an actually obtained vulcanized rubber composition using a measuring apparatus such as a pyrolysis gas chromatograph/mass spectrometer (PyGC/MS).

Further, in the vulcanized rubber composition of the present invention, it is preferable that an abundance ratio γ of silica to the proportion β of the styrene butadiene rubber being incompatible with the butadiene rubber satisfies the following Relation 3:

$$0.6 \leq \gamma \leq 1.4 \quad \text{(Relation 3)}$$

wherein $\gamma = \alpha/\beta$.

Herein, "the abundance ratio γ of silica" is an abundance ratio of silica in the SBR phase to the proportion β of the styrene butadiene rubber being incompatible with the butadiene rubber. When silica is dispersed ideally to the SBR phase, the abundance ratio γ of silica is 1.

The abundance ratio γ of silica to the proportion β of the styrene butadiene rubber being incompatible with the butadiene rubber is preferably not less than 0.6, more preferably not less than 0.8. When the abundance ratio γ of the silica to the proportion β of the styrene butadiene rubber being incompatible with the butadiene rubber is not less than 0.6, abrasion resistance and fuel efficiency tend to be improved. The abundance ratio γ of silica to the proportion β of the styrene butadiene rubber being incompatible with the butadiene rubber is preferably not more than 1.4, more preferably not more than 1.2. When the abundance ratio γ of silica to the proportion β of the styrene butadiene rubber being incompatible with the butadiene rubber is not more than 1.4, abrasion resistance, fuel efficiency and breaking resistance tend to be improved.

In the vulcanized rubber composition of the present invention, it is preferable that the dispersion ratio δ of silica in the entire system satisfies the following Relation 4:

$$\delta \leq 0.8 \quad \text{(Relation 4)}$$

wherein δ=Standard deviation of distance between silica/Average distance between silica.

Herein "the average distance between silica" is a wall-to-wall distance between the adjacent silica aggregates. The silica aggregates are dilated up to a full scale of an image to create pseudo Voronoi polygons, and a distance between the aggregates whose pseudo Voronoi polygons are bordered is measured. The distance between the aggregates can be obtained by measuring a distance between the point and the point where both aggregates including respective points are most adjacent to each other. For example, the distance can be calculated easily from an image photographed with a scanning electron microscope (SEM) by using a commercially available program such as LUZEX (registered trade mark) AP available from NIRECO CORPORATION.

The dispersion ratio δ of silica in the entire system is preferably not more than 0.8, more preferably not more than 0.7. When the dispersion ratio δ of silica in the entire system is not more than 0.8, silica is dispersed in the entire system and physical properties such as abrasion resistance, fuel efficiency and breaking resistance tend to be improved. It is most preferable that the dispersion ratio δ of silica is zero.

The styrene butadiene rubber being incompatible with the butadiene rubber is not limited particularly as far as it is incompatible with the butadiene rubber, and usual ones in rubber industries such as an emulsion-polymerized styrene butadiene rubber (E-SBR), a solution-polymerized styrene butadiene rubber (S-SBR) and modified SBR thereof (modified E-SBR, modified S-SBR) can be used. These rubbers may be used alone or may be used in combination of two or more thereof.

BR to be used in the present invention is not limited particularly, and it is possible to use, for example, BR having a cis-1,4 bond content of less than 50% (low-cis BR), BR having a cis-1,4 bond content of not less than 90% (high-cis BR), a rare earth butadiene rubber (rare earth BR) synthesized using a rare earth element catalyst, BR containing a syndiotactic polybutadiene crystal (SPB-containing BR), a modified BR (high cis modified BR, low cis modified BR), and the like. Among these, it is preferable to use at least one selected from the group consisting of a high cis un-modified BR, a high cis modified BR, a low cis un-modified BR and a low cis modified BR, and it is more preferable to use a high cis un-modified BR.

Examples of high cis BR include BR730 and BR51 of JSR Corporation, BR1220 of ZEON CORPORATION, BR130B, BR150B and BR710 of Ube Industries, Ltd., and the like. Among high cis BRs, those having a cis-1,4-bond content of not less than 95% are further preferred. These BRs may be used alone or may be used in combination of two or more thereof. The use of high cis BR enables low temperature property and abrasion resistance to be improved. Examples of a low cis BR include BR1250 of ZEON CORPORATION, and the like. These BRs may be used alone or may be used in combination of two or more thereof.

A modified BR is not limited particularly, and a modified BR having an alkoxyl group as a modified group on BR, and the like are preferred, and particularly a high cis modified BR is more preferred.

Silica is not one limited particularly, and usual ones in tire industries, for example, silica (silicic acid anhydride) prepared by a dry method, silica (hydrous silicic acid) prepared by a wet method, and the like can be used.

A nitrogen adsorption specific surface area ($N_2SA$) of the silica is preferably not less than 70 $m^2/g$, more preferably not less than 140 $m^2/g$. When the silica has $N_2SA$ of not less than 70 $m^2/g$, sufficient reinforcing property can be obtained and breaking resistance and abrasion resistance can be made satisfactory. The $N_2SA$ of the silica is preferably not more than 220 m²/g, more preferably not more than 200 m²/g. When the $N_2SA$ of the silica is not more than 220 m²/g, dispersion of the silica is easy and processability can be made satisfactory. Herein, the $N_2SA$ of the silica is a value measured by a BET method in accordance with ASTM D3037-81.

The silica content is preferably not less than 15 parts by mass, more preferably not less than 50 parts by mass, based on 100 parts by mass of a rubber component. When the total silica content is not less than 15 parts by mass, there is a tendency that abrasion resistance, breaking resistance and fuel efficiency becomes satisfactory. The total silica content is preferably not more than 120 parts by mass, more preferably not more than 100 parts by mass, based on 100 parts by mass of a rubber component. When the total silica content is not more than 120 parts by mass, there is a tendency that processability and workability are enhanced and lowering of low temperature property due to increase in an amount of silica is prevented.

It is preferable that in addition to the above-mentioned materials, the vulcanized rubber composition of the present invention comprises, according to necessity, rubber components other than SBR incompatible with BR and BR, a silane coupling agent, a filler such as carbon black, a softening agent such as oil, wax, an antioxidant, stearic acid, zinc oxide, a vulcanizing agent, a vulcanizing accelerator, and other various materials used usually in tire industries.

Examples of other rubber components include SBR compatible with BR, a natural rubber (NR), an epoxidized natural rubber (ENR), an isoprene rubber (IR), a styrene-isoprene-butadiene rubber (SIBR), a chloroprene rubber (CR), an acrylonitrile butadiene (NBR), and the like. Whether these rubber components are included in BR phase or SBR phase, or are not included in both of BR and SBR phases and form a third phase in the vulcanized rubber composition depends on compatibility thereof with BR and with SBR, and can be confirmed by analyzing a vulcanized rubber composition for test as mentioned above.

In the vulcanized rubber composition of the present invention, the total content of the styrene butadiene rubber being incompatible with the butadiene rubber, the butadiene rubber and the styrene butadiene rubber being compatible with the butadiene rubber is preferably not less than 80% by mass, more preferably not less than 90% by mass, further preferably 100% by mass. A higher total content of the styrene butadiene rubber being incompatible with the butadiene rubber, the butadiene rubber and the styrene butadiene rubber being compatible with the butadiene rubber is preferable since abrasion resistance, breaking resistance and fuel efficiency can be exhibited more. It is preferable to use rubber components consisting of the styrene butadiene rubber being incompatible with the butadiene rubber, the butadiene rubber and the styrene butadiene rubber being compatible with the butadiene rubber because exhibition of the characteristics of the resulting vulcanized rubber composition is highly correlated with the specified ranges of α, β and γ. When a rubber component to be contained in the SBR phase and a rubber component which is contained in neither the BR phase nor the SBR phase are used as the other rubber components, the total content of the other rubber components is preferably not more than 10% by mass, more preferably not more than 5% by mass based on the total rubber components in the vulcanized rubber composition in order to obtain a sufficient correlation of exhibition of the characteristics of the resulting vulcanized rubber composition with the specified ranges of α, β and γ.

The silane coupling agent is not particularly limited, and any silane coupling agents which have been used in rubber industries in combination with silica can be used. Examples thereof include sulfide silane coupling agents such as bis(3-triethoxysilylpropyl)tetrasulfide, bis(2-triethoxysilylethyl) tetrasulfide, bis(3-trimethoxysilylpropyl)tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane, and chloro silane coupling agents such as 3-chloropropyltrimethoxysilane, 3-chloropropyltriethoxysilane, 2-chloroethyltrimethoxysilane, and 2-chloroethyltriethoxysilane, and the like. These silane coupling agents may be used alone, or at least 2 kinds thereof may be used in combination. Among these, from the view point of good reactivity with the silica, sulfide silane coupling agents are preferred, and bis(3-triethoxysilylpropyl)disulfide is particularly preferred.

When the silane coupling agent is compounded, the content thereof is preferably not less than 3 parts by mass, more preferably not less than 6 parts by mass based on 100 parts by mass of silica. The content of silane coupling agent of not less than 3 parts by mass makes it possible to obtain satisfactory breaking strength. The content of silane coupling agent based on 100 parts by mass of silica is preferably not more than 12 parts by mass, more preferably not more than 10 parts by mass. The content of silane coupling agent of not more than 12 parts by mass makes it possible to obtain an effect offsetting increase in cost.

Examples of carbon black include furnace black, acetylene black, thermal black, channel black, graphite, and the like, and these carbon blacks may be used alone or may be used in combination of two or more thereof. Among these, furnace black is preferable for the reason that low temperature property and abrasion resistance can be improved in good balance.

A nitrogen adsorption specific surface area ($N_2SA$) of carbon black is preferably not less than 70 m²/g, more preferably not less than 90 m²/g from a viewpoint that sufficient reinforcing property and abrasion resistance can be obtained. Further, the $N_2SA$ of carbon black is preferably not more than 300 m²/g, more preferably not more than 250 m²/g from a viewpoint that dispersion thereof is good and heat generation hardly arises. The $N_2SA$ can be measured according to JIS K 6217-2 "Carbon black for rubber industry—Fundamental characteristics—Part 2: Determination of specific surface area—Nitrogen adsorption methods—Single-point procedures".

When carbon black is compounded, the content thereof is preferably not less than 1 part by mass, more preferably not less than 5 parts by mass based on 100 parts by mass of the total rubber components. When the content of carbon black is not less than 1 part by mass, sufficient reinforcing property tends to be obtained. Further, the content of carbon black is preferably not more than 105 parts by mass, more preferably not more than 60 parts by mass, further preferably not more than 20 parts by mass. When the content of carbon black is not more than 105 parts by mass, there is a tendency that good processability is obtained, heat generation can be inhibited, and abrasion resistance can be enhanced.

Oil is not limited particularly, and for example, a process oil, vegetable fats and oils, or a mixture thereof can be used. Examples of usable process oil include a paraffin process oil, an aromatic process oil, a naphthenic process oil, and the like. Examples of vegetable oils and fats include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, tsubaki oil, jojoba oil, macadamia nut oil, tung oil, and the like. Among these, process oils are preferred, and particularly use of a paraffin process oil is preferred.

When compounding oils, a content thereof is preferably not less than 15 parts by mass, more preferably not less than 20 parts by mass based on 100 parts by mass of total rubber components. When the oil content is not less than 15 parts by mass, processability tends to be improved. Further, the oil content is preferably not more than 80 parts by mass, more preferably not more than 70 parts by mass. When the oil content is not more than 80 parts by mass, there is a tendency that deterioration of processability, lowering of abrasion resistance and lowering of resistance to aging are prevented.

An anti-oxidant to be compounded in the present invention can be properly selected from amine, phenol and imidazole compounds and carbamic acid metal salts. These anti-oxidants may be used alone or may be used in combination of two or more thereof. Among them, amine anti-oxidants are preferred for the reason that an ozone resistance can be improved significantly and an effect for exhibiting such a property can be maintained for a long period of time, and N-(1,3-dimethylbutyl)-N'-phenyl-p-phenylenediamine is more preferred.

When the anti-oxidant is compounded, its content is preferably not less than 0.5 part by mass, more preferably not less than 1.0 part by mass, further preferably not less than 1.2 parts by mass based on 100 parts by mass of total rubber components. When the content of anti-oxidant is not less than 0.5 part by mass, sufficient ozone resistance tends to be obtained. Further, the content of anti-oxidant is preferably not more than 8 parts by mass, more preferably not more than 4 parts by mass, further preferably not more than 2.5 parts by mass. When the content of anti-oxidant is not more than 8 parts by mass, there is a tendency that discoloration can be inhibited and bleeding can be inhibited.

Any of wax, stearic acid and zinc oxide which is used usually in rubber industries can be used suitably.

A vulcanizing agent is not limited particularly, and those usually used in rubber industries can be used, and sulfur atom-containing vulcanizing agents are preferred and a sulfur powder is used particularly preferably.

A vulcanization accelerator also is not limited particularly, and those usually used in rubber industries can be used.

It is preferable that the vulcanized rubber composition of the present invention comprises 15 to 120 parts by mass of a filler based on 100 parts by mass of rubber components comprising the styrene butadiene rubber being incompatible with the butadiene rubber and the butadiene rubber.

A content of filler is preferably not less than 15 parts by mass, more preferably not less than 30 parts by mass based on 100 parts by mass of rubber components. When the filler content is not less than 15 parts by mass, there is a tendency that abrasion resistance, breaking resistance and fuel efficiency becomes satisfactory. Also, the filler content is preferably not more than 120 parts by mass, more preferably not more than 100 parts by mass. When the filler content is not more than 120 parts by mass, there is a tendency that processability and workability are enhanced and lowering of low temperature property due to an increased amount of filler is prevented. The filler includes silica, carbon black, aluminum hydroxide and the like, and it is preferable that silica is blended in an amount of preferably not less than 50% by mass, more preferably not less than 70% by mass based on the total amount of filler.

It is preferable that the vulcanized rubber composition of the present invention comprises 15 to 80 parts by mass of a softening agent based on 100 parts by mass of rubber components comprising the styrene-butadiene rubber being incompatible with the butadiene rubber and the butadiene rubber.

A content of the softening agent is preferably not less than 15 parts by mass, more preferably not less than 20 parts by mass based on 100 parts by mass of the rubber components. When the content of the softening agent is not less than 15 parts by mass, processability tends to be enhanced. Also, the content of the softening agent is preferably not more than 80 parts by mass, more preferably not more than 70 parts by mass. When the content of the softening agent is not more than 80 parts by mass, there is a tendency that lowering of processability, lowering of abrasion resistance and deterioration of resistance to aging are prevented. Examples of the softening agent include an aromatic oil, a naphthenic oil, a paraffinic oil, a terpene resin, and the like.

The vulcanized rubber composition of the present invention can be prepared by known methods, for example, by kneading the above-mentioned components with, for example, a Banbury mixer, a kneader, an open roll or the like and then vulcanizing a resultant kneaded product.

The kneading step for preparing the vulcanized rubber composition of the present invention can be adequately selected, according to kinds of rubbers to be used, from a method of kneading all of rubber components and silica at the same time, a method of kneading a butadiene rubber and silica and then adding, to a resultant kneaded product, a styrene-butadiene rubber being incompatible with the butadiene rubber for further kneading, a method of kneading a butadiene rubber and silica and then adding, to a resultant kneaded product, a styrene-butadiene rubber being incompatible with the butadiene rubber and silica for further kneading, a method of preparing respective master batches of each of rubber components with silica and performing kneading of the master batches, and other kneading methods.

The vulcanized rubber composition of the present invention can be used for tire application, for example, tire members such as a tread, a carcass, a side wall and a bead as well as other industrial products such as a vibration proof rubber, a belt and a hose. Particularly, from the viewpoint of satisfactory fuel efficiency, abrasion resistance and breaking resistance, the vulcanized rubber composition is used suitably on a tread, and in the case of a tread of two-layer structure comprising a cap tread and a base tread, is suitably used on the cap tread.

The tire of the present invention can be produced by a usual method using the vulcanized rubber composition of the present invention. Namely the rubber composition of the present invention is extrusion-processed into a shape of a tread of a tire in its unvulcanized state, and further, the obtained extruded product is laminated with other tire parts to form an unvulcanized tire on a tire molding machine by a usual forming method. The tire of the present invention can be produced by heating and pressurizing this unvulcanized tire in a vulcanizer.

EXAMPLE

The present invention is explained below by means of Examples, but is not limited to only the Examples.

Examples 1 to 6 and Comparative Examples 1 to 3

For each of vulcanized rubber compositions having indexes α, β, γ and δ as shown in Table 1, the following tests were performed to evaluate abrasion resistance, fuel efficiency and breaking resistance. Each of test results is shown in Table 1. Measurements and evaluations of α, δ, abrasion resistance, fuel efficiency and breaking resistance were carried out using vulcanized rubber compositions which have been stored at room temperature and have been left to stand for 200 hours after completion of vulcanization (about one week later). The value β corresponds to the content (mass) of a styrene-butadiene rubber being incompatible with a butadiene rubber based on the total rubber components (mass) blended for preparation of vulcanized rubber composition, and γ is α/β.

<Abrasion Resistance>

An abrasion loss of each vulcanized rubber composition was measured with a Lambourn abrasion testing machine being available from IWAMOTO Quartz GlassLabo Co., Ltd. under the conditions of a surface rotation speed of 50 m/min, a load of 3.0 kg, an amount of falling sand of 15 g/min, and a slip ratio of 20%, and a reciprocal of the abrasion loss was obtained. A reciprocal of the abrasion loss of Comparative Example 1 is assumed to be 100, and reciprocals of other abrasion losses are indicated by indexes. The larger the index is, the more excellent the abrasion resistance is. A performance target value is 105 or more.

<Fuel Efficiency>

A strip-like test piece having a width of 1 mm or 2 mm and a length of 40 mm was punched out from a sheet-like vulcanized rubber composition and was subjected to testing.

A tan δ was measured at a dynamic strain amplitude of 1%, a frequency of 10 Hz and a temperature of 50° C. with a spectrometer available from Ueshima Seisakusho Co., Ltd., and a tan δ of each formulation was indicated with an index obtained by the following equation. The larger the index is, the lower a rolling resistance is and the more excellent a fuel efficiency is. A performance target value is 105 or more.

(Index of fuel efficiency)=(Tan δ of Comparative Example 1)/(Tan δ of each formulation)×100

<Breaking Resistance>

A tear strength (N/mm) of unnicked angle test piece made of a vulcanized rubber composition was measured in accordance with the test method shown in JIS K 6252 "Rubber, vulcanized or thermoplastic-Determination of tear strength". A tear strength of each formulation was obtained by the following equation and indicated with an index. The larger an index is, the higher a tear strength is and the more excellent a breaking resistance is. A target value is 105 or more.

(Index of breaking resistance)=(Tear strength of each formulation)/(Tear strength of Comparative Example 1)×100

<Evaluation of Morphology and Evaluation of Localization of Silica>

A vulcanized rubber composition was subjected to surface shaping and observed with a scanning electron microscope (SEM). The morphology of each phase could be confirmed by comparison of a contrast. As a result, in the vulcanized rubber compositions of Examples 1 to 6 and Comparative Examples 1 to 3, it was confirmed that the phase (SRB phase) comprising the styrene-butadiene rubber being incompatible with the butadiene rubber and the phase (BR phase) comprising the butadiene rubber are incompatible with each other.

Silica can be observed in the form of particulate. In an SEM photograph of one sample, ten regions of 2 μm×2 μm each which do not overlap each other were selected. In each region, an area of silica per unit area of each phase was measured, and an abundance ratio of the silica of the SRB phase was calculated. After confirming that a difference between the maximum ratio and the minimum ratio among the ratios of the ten regions is within 10%, an average of the ratios in the ten regions was obtained and indicated by a.

<Evaluation of Dispersion Ratio of Silica>

An SEM observation image was converted to a binary image of a rubber portion and a silica portion, and by using an automatic image processing analysis system LUZEX (registered trade mark) AP available from NIRECO CORPORATION, an average distance of closest approach between the silica aggregates and a standard deviation were calculated to obtain the dispersion ratio δ.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Abundance ratio of silica in SBR phase (α) | 0.52 | 0.7 | 0.55 | 0.69 | 0.41 | 0.588 | 1.5 | 1.55 | 1.91 |
| Proportion of SBR being incompatible with BR (β) | 0.5 | 0.6 | 0.4 | 0.7 | 0.5 | 0.6 | 0.6 | 0.6 | 0.6 |
| Abundance ratio of silica to the proportion of SBR being incompatible with BR (γ) | 1.04 | 1.17 | 1.38 | 0.99 | 0.82 | 0.98 | 2.50 | 2.58 | 3.18 |
| Dispersion ratio of silica (δ) | 0.5 | 0.65 | 0.78 | 0.45 | 0.78 | 0.70 | 0.86 | 0.81 | 0.98 |

TABLE 1-continued

| | Example | | | | | | Comparative Example | | |
|---|---|---|---|---|---|---|---|---|---|
| | 1 | 2 | 3 | 4 | 5 | 6 | 1 | 2 | 3 |
| Evaluation | | | | | | | | | |
| Index of abrasion resistance | 135 | 123 | 105 | 129 | 110 | 124 | 100 | 105 | 98 |
| Index of fuel efficiency | 126 | 117 | 107 | 113 | 110 | 115 | 100 | 108 | 95 |
| Index of breaking resistance | 120 | 122 | 109 | 115 | 115 | 120 | 100 | 92 | 99 |

From the results shown in Table 1, it is seen that in an incompatible system including the phase (SBR phase) comprising the styrene-butadiene rubber being incompatible with the butadiene rubber and the silica and the phase (BR phase) comprising the butadiene rubber and the silica, abrasion resistance, fuel efficiency and breaking resistance can be improved in good balance by using the vulcanized rubber composition, in which the abundance ratio α of the silica in the SRB phase and the proportion β of the styrene butadiene rubber being incompatible with the butadiene rubber are within the respective predetermined ranges.

Various kinds of chemicals used in Reference Preparation Examples 1 to 6 and Comparative Reference Preparation Examples 1 to 3 are collectively shown below. The vulcanized rubber compositions obtained in Reference Preparation Examples 1 to 6 and Comparative Reference Preparation Examples 1 to 3 correspond to the vulcanized rubber compositions of Examples 1 to 6 and Comparative Examples 1 to 3, respectively.

Styrene-butadiene rubber (SBR1): SBR prepared in the following Synthesis Example 1 (being incompatible with BR)
Styrene-butadiene rubber (SBR2): SBR prepared in the following Synthesis Example 2 (being compatible with BR)
Butadiene rubber (BR1): BR730 available from JSR Corporation (unmodified, cis-1,4 content: 95%)
Butadiene rubber (BR2): BR150B available from Ube Industries, Ltd. (unmodified, cis-1,4 content: 98%)
Butadiene rubber (BR3): BR prepared in the following Synthesis Example 3
Carbon black: DIABLACK I (ISAF carbon, $N_2SA$: 114 $m^2/g$, average particle size: 23 nm) available from Mitsubishi Chemical Corporation
Silica: ULTRASIL (registered trade mark) VN3 ($N_2SA$: 175 $m^2/g$) available from EVONIK INDUSTRIES AG
Silane coupling agent: Si266 available from EVONIK INDUSTRIES AG Mineral oil: PS-32 (paraffinic process oil) available from Idemitsu Kosan Co., Ltd.
Stearic acid: Stearic acid "Kiri" available from NOF CORPORATION Zinc oxide: Zinc oxide II available from MITSUI MINING 86 SMELTING CO., LTD.
Anti-aging agent: NOCRAC 6C (N-(1,3-dimethylbutyl)-N-phenyl-p-phenylenediamine) available from OUCHI SHINKO CHEMICAL INDUSTRIAL CO., LTD.
Wax: Ozoace wax available from NIPPON SEIRO CO., LTD.
Sulfur: Sulfur powder available from TSURUMI CHEMICAL INDUSTRY CO., LTD.
Vulcanization accelerator NS: NOCCELER NS (N-tert-butyl-2-benzothiazolylsulfenamide) available from OUCHI SHINKO CHEMICAL INDUSTRIAL CO., LTD.
Vulcanization accelerator DPG: NOCCELER D (1,3-diphenylguanidine) available from OUCHI SHINKO CHEMICAL INDUSTRIAL CO., LTD.

Synthesis Example 1

Synthesis of SBR1

Into a 100 ml ampoule bottle subjected to nitrogen replacement were added slowly 28 g of cyclohexane and 8.6 mmol of tetramethylethylenediamine, followed by addition of 6.1 mmol of n-butyl lithium. Then 8.0 g of isoprene was added thereto slowly, and the mixture was reacted for 120 minutesin theampoule bottle at 60° C. to obtain an isoprene block (referred to as Initiator 1).

A weight-average molecular weight of Initiator 1 was 2,200, a vinyl bond content was 72.3 (mass %), and a molecular weight distribution (Mw/Mn) was 1.08.

Then, 4,000 g of cyclohexane, 483.5 g of 1,3-butadiene, 211.5 g of styrene and 0.18 g of tetramethylethylenediamine were charged into an autoclave with a stirrer under a nitrogen atmosphere, and then a total amount of Initiator 1 was added thereto to start polymerization at 40° C. After confirming that a polymerization conversion rate has reached between 95 and 100%, 0.08 mmol of 1,6-bis(trichlorosilyl)hexane in a state of 20% by mass concentration in a cyclohexane solution was added and the mixture was reacted for 10 minutes. Further, 0.027 mmol of polyorganosiloxane A in a state of 20% by mass concentration in a xylene solution was added, and the mixture was reacted for 30 minutes. Thereafter, methanol in an amount corresponding to double mole of used n-butyl lithium was added as polymerization terminator to obtain a solution containing a modified SBR. To this solution was added, as an antioxidant, 0.15 part by mass of Irganox 1520L (available from Ciba Specialty Chemicals Co., Ltd.) to 100 parts by mass of the modified SBR, and then the solvent was removed by steam stripping, followed by 24-hour vacuum drying at 60° C. to obtain a modified SBR in the form of a solid.

$$CH_3-\underset{\underset{CH_3}{|}}{\overset{\overset{CH_3}{|}}{Si}}-O-\left[\underset{\underset{X_1}{|}}{\overset{\overset{CH_3}{|}}{Si}}-O\right]_{80}-\left[\underset{\underset{CH_3}{|}}{\overset{\overset{CH_3}{|}}{Si}}-O\right]_{120}-\underset{\underset{CH_3}{|}}{\overset{\overset{CH_3}{|}}{Si}}-CH_3 \quad (I)$$

wherein $X_1$ is $$-C_3H_6-O-CH_2-\underset{\underset{O}{\diagdown\diagup}}{CH}-CH_2.$$

Various physical properties of the obtained modified SBR were measured by the following methods. A weight-average molecular weight ($\times 10^4$) was 90.0, a molecular weight distribution (Mw/Mn) was 1.65, a styrene unit content (mass %) of the styrene-butadiene copolymer contained in a moiety other than an isoprene block was 41, a vinyl bond content (%) in the butadiene monomer unit in the styrene-butadiene copolymer contained in a moiety other than an isoprene block was 30, a Mooney viscosity ($ML_{1+4}(100°$ C.)) was 84.0, and the obtained modified SBR was incompatible with BR.

[Weight-Average Molecular Weight, Molecular Weight Distribution (Mw/Mn)]

Measurement was carried out under the following conditions using a gel permeation chromatograph (brand name: HLC-8020, available from TOSO CORPORATION) and a differential refractometer RI-8020 (available from TOSO CORPORATION) as a detector, and values measured were calculated in terms of standard polystyrene.
Column: Two columns GMH-HR-H (available from TOSO CORPORATION) were connected in series.
Column temperature: 40° C.
Mobile phase: Tetrahydrofuran

[Styrene Unit Content and Vinyl Bond Content]

Styrene unit content and vinyl bond content were measured by $^1$H-NMR analysis.

[Mooney Viscosity ($ML_{1+4}(100°$ C.))]

Measurement was made in accordance with JIS K 6300-1:2001.

[Compatibility with BR]

Compatibility of the obtained SBR1 with BR was evaluated by observing, with an SEM, a vulcanized rubber composition prepared from the obtained SBR1 and BR1 in a mass ratio of 70:30.

Synthesis Example 2

Synthesis of SBR2

A stainless polymerization reaction vessel having an inner volume of 20 L was washed, dried and the inside thereof was substituted by dry nitrogen, and to the polymerization reaction vessel were charged 10.2 kg of hexane (specific gravity: 0.68 g/cm$^3$), 547 g of 1,3-butadiene, 173 g of styrene, 6.1 ml of tetrahydrofuran and 5.0 ml of ethylene glycol diethyl ether. Then, a n-hexane solution in which 13.1 mmol of n-butyllithium was dissolved into n-hexane was added thereto to start polymerization.

A copolymerization of 1,3-butadiene and styrene was conducted for three hours while continuously supplying monomers into the polymerization reaction vessel, with a stirring speed of 130 rpm and a temperature inside the polymerization reaction vessel of 65° C. In the whole polymerization, the supplied amount of 1,3-butadiene was 821 g and the supplied amount of styrene was 259 g.

Then, the obtained polymer solution was stirred at a stirring speed of 130 rpm and 11.1 mmol of 3-diethylaminopropyltriethoxysilane was added, followed by stirring for 15 minutes. To the polymer solution was added 20 ml of a hexane solution containing 0.54 ml of methanol, followed by further stirring of the polymer solution for five minutes.

To the polymer solution were added 1.8 g of 2-tert-butyl-6-(3-tert-butyl-2-hydroxy-5-methylbenzyl)-4-methylphenyl acrylate (brand name: SUMILIZER (Registered trade name) GM available from Sumitomo Chemical Company, Limited) and 0.9 g of pentaerythrityl tetrakis (3-laurylthiopropionate) (brand name: SUMILIZER (Registered trade name) TP-D available from Sumitomo Chemical Company, Limited), and then the polymer was collected from the polymer solution by steam stripping.

Various physical properties of the obtained SBR2 were measured by the same methods as in Synthesis Example 1.

A weight-average molecular weight ($\times 10^4$) was 95.0, a molecular weight distribution (Mw/Mn) was 1.1, a styrene unit content (mass %) was 25, a vinyl bond content (%) was 59, a Mooney viscosity ($ML_{1+4}(100°$ C.)) was 75, and the obtained SBR2 was compatible with BR.

Synthesis Example 3

Preparation of BR3

(1) Synthesis of Conjugated Diene Polymer

A catalytic composition (iodine atom/lanthanoid-containing compound (molar ratio)=2.0) was obtained by subjecting a cyclohexane solution containing 0.18 mmol of neodymium versatate, a toluene solution containing 3.6 mmol of methyl aluminoxane, a toluene solution containing 6.7 mmol of diisobutyl aluminum hydride and a toluene solution containing 0.36 mmol of trimethylsilyliodide to reaction and maturation over 60 minutes at 30° C. with 0.90 mmol of 1,3-butadiene. Subsequently 2.4 kg of cyclohexane and 300 g of 1,3-butadiene were added into a 5 liter autoclave under a nitrogen atmosphere. Then the above catalytic composition was added into the autoclave, followed by 2-hour polymerization reaction at 30° C. to obtain a polymer solution. A reaction conversion ratio of the added 1,3-butadiene rubber was substantially 100%.

Here, in order to measure various physical properties of the conjugated diene polymer (hereinafter also referred to as "polymer") before modification, 200 g of polymer solution was sampled from the above polymer solution, and to this polymer solution was added a methanol solution containing 1.5 g of 2,4-di-tert-butyl-p-cresol to terminate the polymerization reaction. Thereafter, the solvent was removed by steam stripping, followed by drying with 110° C. rolls, and the obtained dried product was used as the polymer.

Various physical properties of the polymer were measured by the following methods. A Mooney viscosity ($ML_{1+4}(100°$ C.)) was 12, a molecular weight distribution (Mw/Mn) was 1.6, an amount of cis-1,4 bond was 99.2 mass %, and an amount of 1,2-vinyl bond was 0.21 mass %.

[Mooney viscosity ($ML_{1+4}(100°$ C.))]

The Mooney viscosity was measured in accordance with JIS K 6300 using an L-rotor under the conditions of one minute of preheating, four minutes of rotor operation time and 100° C. of a temperature.

[Molecular Weight Distribution Mw/Mn)]

Measurement was carried out under the following conditions using a gel permeation chromatograph (brand name: HLC-8120GPC, available from TOSO CORPORATION) and a differential refractometer as a detector, and molecular weight was calibrated by standard polystyrene.
Column: Two columns of brand name of "GMHHXL" (available from TOSO CORPORATION).
Column temperature: 40° C.
Mobile phase: Tetrahydrofuran
Sample concentration: 10 mg/20 ml

[Amount of cis-1,4 bond, amount of 1,2-vinyl bond]

A content of cis-1,4 bond and a content of 1,2-vinyl bond were measured by $^1$H-NMR analysis and $^{13}$C-NMR analysis. For NMR analyses, a brand name "EX-270" available from JEOL Ltd. was used. Specifically for the $^1$H-NMR analysis, a ratio of 1,4-bond to 1,2-bond in the polymer was calculated from signal strengths at 5.30 to 5.50 ppm (1,4-bond) and 4.80 to 5.01 ppm (1,2-bond). Further, for the $^{13}$C-NMR analysis, a ratio of cis-1,4-bond to trans-1,4-bond in the polymer was calculated from signal strengths at 27.5 ppm (cis-1,4-bond) and 32.8 ppm (trans-1,4-bond). An amount of cis-1,4-bond (mass %) and an amount of 1,2-vinyl bond (mass %) were obtained from these calculated ratios.

(2) Modification of Conjugated Diene Polymer

In order to obtain BR3, the polymer solution of conjugated diene polymer obtained in (1) above was subjected to the following processing. To the polymer solution kept at a temperature of 30° C. was added a toluene solution containing 1.71 mmol of 3-glycidoxipropyltrimethoxysilane, followed by 30-minute reaction to obtain a reaction solution. Thereafter, to this reaction solution was added a toluene solution containing 1.71 mmol of 3-aminopropyltriethoxysilane, followed by 30-minute stirring. Subsequently, to this reaction solution was added a toluene solution containing 1.28 mmol of tetraisopropyl titanate, followed by 30-minute stirring. Thereafter, in order to terminate the polymerization reaction, thereto was added a methanol solution containing 1.5 g of 2,4-di-tert-butyl-p-cresol, and a resultant solution was used as a modified polymer solution. A yield thereof was 2.5 kg. Then, 20 liter of an aqueous solution adjusted with sodium hydroxide to have a pH value of 10 was added to this modified polymer solution, followed by condensation reaction as well as removal of a solvent over two hours at 110° C. Thereafter, drying was conducted with rolls of 110° C. to obtain a modified polymer BR3.

Various physical properties of the obtained BR3 were measured by the following methods (It should be noted that a molecular weight distribution (Mw/Mn) was measured under the same conditions as in the above polymer). A Mooney viscosity ($ML_{1+4}(125° C.)$) was 46, a molecular weight distribution (Mw/Mn) was 2.4, a cold flow was 0.3 mg/min, stability with time was 2, and a glass transition temperature was −106° C.

[Mooney Viscosity ($ML_{1+4}(125° C.)$)]

The Mooney viscosity was measured in accordance with JIS K 6300 using an L-rotor under the conditions of one minute of preheating, four minutes of rotor operation time and 125° C. of a temperature.

[Cold Flow]

The cold flow was measured by passing and flowing out the polymer through a ¼ inch orifice at a pressure of 3.5 lb/in$^2$ and a temperature of 50° C. After allowing to stand for 10 minutes to obtain a stationary state, a flowing-out speed was measured, and a measured value was shown by milligram per minute (mg/min).

[Stability with Time]

Stability with time is shown by a value obtained by measuring a Mooney viscosity ($ML_{1+4}(125° C.)$) after keeping the polymer for two days in a thermostatic bath at 90° C. and calculating from the following formula. The smaller the value is, the more satisfactory the stability with time is.

[Mooney viscosity ($ML_{1+4}(125° C.)$) after keeping
the polymer for two days in thermostatic bath
at 90° C.]−[Mooney viscosity ($ML_{1+4}(125° C.)$)
measured immediately after synthesis]    Formula:

[Glass Transition Temperature]

The glass transition temperature was obtained as a glass transition starting temperature by measuring in accordance with JIS K 7121 using a differential scanning calorimeter (Q200) available from TA Instruments, Japan while heating up at a temperature elevating rate of 10° C./min.

Reference Preparation Examples 1 to 6 and Comparative Reference Preparation Examples 1 to 3

According to the formulation shown in step (I) of Table 2, rubber components, silica and other materials were kneaded for three minutes with a 1.7 liter Banbury mixer at the compound temperature at the time of discharge from the mixer of 150° C. to obtain a kneaded product. Next, the obtained kneaded product and other materials in accordance with the formulation shown in step (II) of Table 2 were kneaded for two minutes with the Banbury mixer at the compound temperature at the time of discharge from the mixer of 150° C. to obtain a kneaded product. To the obtained kneaded product were added sulfur and a vulcanization accelerator in accordance with the formulation shown in step (III) of Table 2, followed by 5-minute kneading at a temperature of 150° C. using an open roll to obtain an un-vulcanized rubber composition. In Reference Preparation Examples 1, 4 and 5, two kneaded products were prepared in accordance with the formulations shown in step (I) of Table 2, respectively, and were used in the step (II).

Each of the obtained un-vulcanized rubber compositions was press-vulcanized for 12 minutes at 170° C. using a 0.5 mm thick metal mold to obtain each of vulcanized rubber compositions.

TABLE 2

|  | Reference Preparation Example | | | | | | Comp. Ref. Prep. Ex. | | |
|---|---|---|---|---|---|---|---|---|---|
|  | 1 | 2 | 3 | 4 | 5 | 6 | 1 | 2 | 3 |
|  | Compounding amount (part by mass) | | | | | | | | |
| Step (I) | | | | | | | | | |
| SBR1 | 50 | — | — | 40 | 70 | — | 50 | — | — | 60 | 60 | 60 |
| SBR2 | — | — | — | — | — | — | 20 | — | — | 20 | — |
| BR1 | — | 50 | — | — | — | — | — | 30 | — | — | 20 | — |
| BR2 | — | — | — | 20 | — | — | — | — | 20 | — | — | — |
| BR3 | — | — | 40 | — | — | 30 | — | — | — | — | — | — |
| Carbon black | — | 5 | 5 | 5 | — | 5 | — | 5 | 5 | 5 | 5 | 5 |
| Silica | 40 | 40 | 20 | 35 | 65 | 25 | 40 | 40 | 80 | 70 | 60 | 80 |
| Silane coupling agent | 3 | 3 | 6 | 3 | 4 | 2 | 3 | 3 | 6 | 6 | 5 | 6 |
| Oil | 10 | 10 | 20 | 20 | 5 | 5 | 10 | 10 | 20 | 10 | 10 | 10 |
| Step (II) | | | | | | | | | |
| SBR1 | — | 60 | — | — | — | 60 | — | — | — |
| SBR2 | — | — | 40 | — | — | 20 | — | — | — |
| BR1 | — | — | — | — | — | — | — | — | — |
| BR2 | — | — | — | — | — | — | — | — | 40 |

TABLE 2-continued

|  | Reference Preparation Example | | | | | | Comp. Ref. Prep. Ex. | | |
| --- | --- | --- | --- | --- | --- | --- | --- | --- | --- |
|  | 1 | 2 | 3 | 4 | 5 | 6 | 1 | 2 | 3 |
|  | Compounding amount (part by mass) | | | | | | | | |
| BR3 | — | — | — | — | — | — | 40 | — | — |
| Silica | — | 60 | 35 | — | — | — | — | — | — |
| Silane coupling agent | — | — | 3 | — | — | — | — | — | — |
| Wax | 1 | 1 | 1 | 1 | 1 | 1 | 1 | 1 | 1 |
| Antioxidant | 2 | 2 | 2 | 2 | 2 | 2 | 2 | 2 | 2 |
| Stearic acid | 1 | 1 | 1 | 1 | 1 | 1 | 1 | 1 | 1 |
| Zinc oxide | 1.5 | 1.5 | 1.5 | 1.5 | 1.5 | 1.5 | 1.5 | 1.5 | 1.5 |
| Step (III) | | | | | | | | | |
| Sulfur | 1 | 1 | 1 | 1 | 1 | 1 | 1 | 1 | 1 |
| Vulcanization accelerator | 2 | 2 | 2 | 2 | 2 | 2 | 2 | 2 | 2 |

EXPLANATION OF SYMBOLS

1 SBR phase
2 BR phase
3 Silica

What is claimed is:

1. A vulcanized rubber composition having:
   a phase (SBR phase) comprising a styrene butadiene rubber being incompatible with a butadiene rubber and silica, and
   a phase (BR phase) comprising a butadiene rubber and silica,
   wherein the SBR phase and the BR phase are incompatible with each other,
   an abundance ratio $\alpha$ of silica in the SBR phase after vulcanization satisfies the following Relation 1, and
   a proportion $\beta$ of the styrene butadiene rubber being incompatible with the butadiene rubber satisfies the following Relation 2:

$$0.3 \leq \alpha \leq 0.7 \quad \text{(Relation 1)}$$

$$0.4 \leq \beta \leq 0.8 \quad \text{(Relation 2)}$$

wherein $\alpha$=Amount of silica in SBR phase/(Amount of silica in SBR phase+Amount of silica in BR phase) and $\beta$=(Mass of styrene butadiene rubber being incompatible with butadiene rubber in vulcanized rubber composition/Mass of total rubber components in vulcanized rubber composition).

2. The vulcanized rubber composition of claim 1, wherein an abundance ratio $\gamma$ of silica to the proportion $\beta$ of the styrene butadiene rubber being incompatible with the butadiene rubber satisfies the following Relation 3 and a dispersion ratio $\delta$ of silica in the entire system satisfies the following Relation 4:

$$0.6 \leq \gamma \leq 1.4 \quad \text{(Relation 3)}$$

$$\delta \leq 0.8 \quad \text{(Relation 4)}$$

wherein $\gamma = \alpha/\beta$ and $\delta$=Standard deviation of distance between silica/Average distance between silica.

3. The vulcanized rubber composition of claim 1, comprising 15 to 120 parts by mass of the silica based on 100 parts by mass of the rubber components comprising the styrene butadiene rubber being incompatible with the butadiene rubber and the butadiene rubber.

4. The vulcanized rubber composition of claim 1, comprising 15 to 120 parts by mass of a filler based on 100 parts by mass of the rubber components comprising the styrene butadiene rubber being incompatible with the butadiene rubber and the butadiene rubber, wherein the filler comprises not less than 50% by mass of the silica based on the total amount of filler.

5. The vulcanized rubber composition of claim 1, wherein the butadiene rubber is a butadiene rubber having a cis-1,4 bond content of not less than 90%.

6. The vulcanized rubber composition of claim 1, comprising 15 to 80 parts by mass of a softening agent based on 100 parts by mass of the rubber components comprising the styrene butadiene rubber being incompatible with the butadiene rubber and the butadiene rubber.

7. A tire comprising a tread composed of the rubber composition of claim 1.

* * * * *